United States Patent [19]
Line

[11] Patent Number: 6,073,383
[45] Date of Patent: *Jun. 13, 2000

[54] ARTIFICIAL FISH BAIT WITH S-SHAPED BODY AND TAIL WITH CHANGEABLE COLOR TAB

[76] Inventor: Ronnie G. Line, 7747 E. 24th, Tulsa, Okla. 74129

[ * ] Notice: Under 35 U.S.C. 154(b), the term of this patent shall be extended for 204 days.

[21] Appl. No.: 08/511,310

[22] Filed: Aug. 4, 1995

[51] Int. Cl.⁷ .................................................. A01K 85/00
[52] U.S. Cl. ............................................................. 43/42.24
[58] Field of Search .................. 43/42.22, 42.24, 43/42.26, 42.32

[56] References Cited

U.S. PATENT DOCUMENTS

| | | | |
|---|---|---|---|
| D. 288,347 | 2/1987 | Lumsden | 43/42.24 |
| 2,334,792 | 11/1943 | Royston | 43/42.26 |
| 2,503,672 | 4/1950 | Johnson et al. | |
| 2,927,392 | 3/1960 | Lievense et al. | |
| 2,955,378 | 10/1960 | Burke | |
| 3,967,406 | 7/1976 | Anderson | 43/42.24 |
| 4,138,792 | 2/1979 | Hill | 43/42.24 |
| 4,592,161 | 6/1986 | Smith | 43/42.24 |
| 4,653,212 | 3/1987 | Pixton | 43/4.5 |
| 4,744,168 | 5/1988 | McClellan | 43/42.24 |
| 4,785,569 | 11/1988 | Thomas | 43/42.24 |
| 4,887,377 | 12/1989 | Morris | 43/42.24 |
| 4,953,319 | 9/1990 | Kasper et al. | 43/42.06 |
| 5,119,582 | 6/1992 | Dahl | 43/42.36 |
| 5,136,801 | 8/1992 | Pond | 43/42.24 |
| 5,142,811 | 9/1992 | Freeman | 43/42.53 |
| 5,197,220 | 3/1993 | Gibbs et al. | 43/42.09 |

OTHER PUBLICATIONS

American Heritage Dictionary, Second College Edition, p. 1322, Jan. 1982.
Bass Pro Shops, 1989 Catalog, p. 204.

*Primary Examiner*—Kurt Rowan
*Attorney, Agent, or Firm*—Head, Johnson and Kachigian

[57] ABSTRACT

An artificial fishing lure of flexible material simulates an eel or snake with a body and tail in a normally S-shaped curve extending above the head of the lure, but will undulate a natural action through the water when retrieved. A snap on/off colored tab or button may be attached to the tail as an attractant.

8 Claims, 4 Drawing Sheets

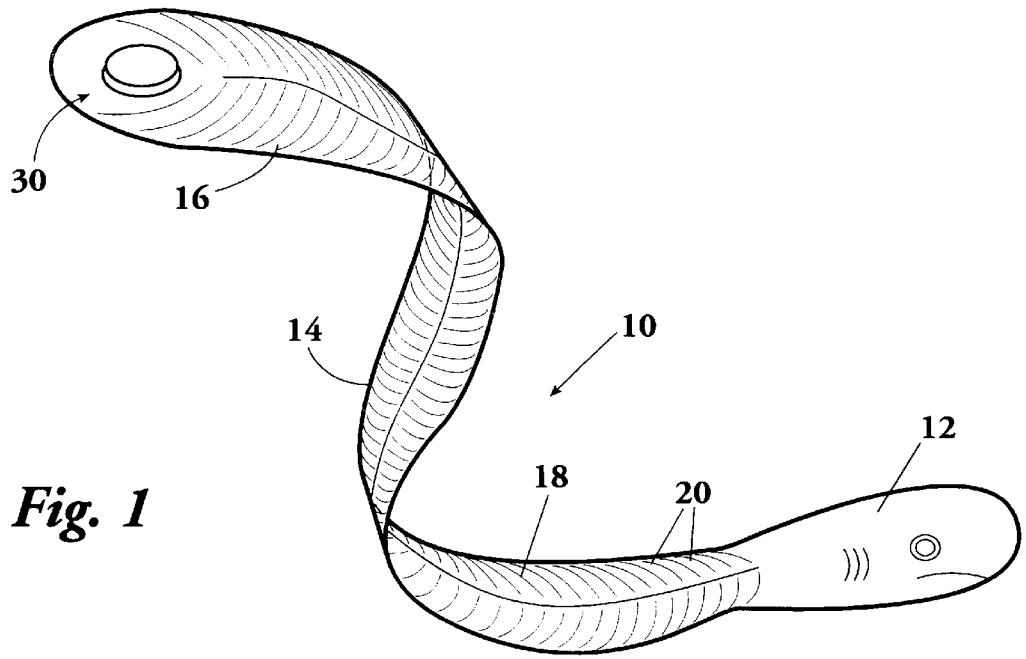
Fig. 1
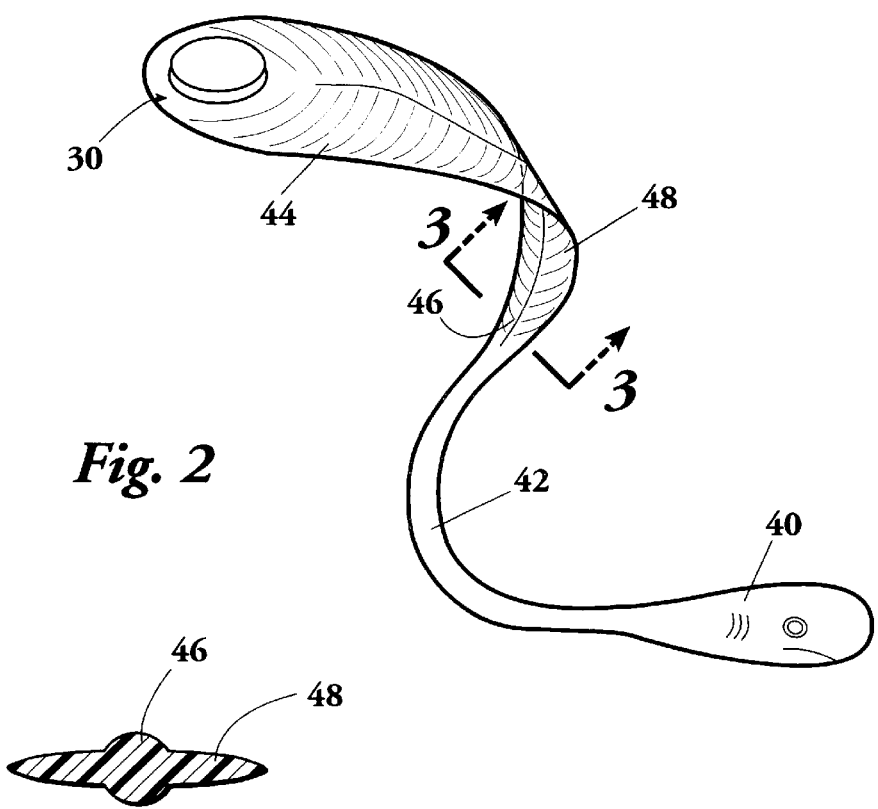
Fig. 2
Fig. 3

ARTIFICIAL FISH BAIT WITH S-SHAPED BODY AND TAIL WITH CHANGEABLE COLOR TAB

BACKGROUND OF THE INVENTION

The art is replete with abundance of artificial fish lures which have been designed such that the lure moves through the water in an undulating manner so as to simulate the swimming movement of a worm, snake or eel. Such lures can be found, for example, in the following U.S. Pat. Nos.:

2,503,672 Johnson, et al.

2,927,392 Livensey, et al.

2,955,378 Burke

D288,347 Lumsden 4,138,792 Hill 4,653,212 Pixton 4,953,319 Kasper et al.

It has become known that there are many attractants for fish which include taste, scent, color, motion, noise, and light and that there are increased chances for catching fish by utilizing one or more of these concepts within artificial fishing lures. In addition, it has become known that the color in being an attractant depends upon several factors including the turbidity of the water, fishing depth, and atmospheric conditions, i.e., sunny, cloudy or dark, etc. Having the ability to quickly change the color of the lure or parts thereof without changing or retying a new lure, would be desirable.

SUMMARY OF THE INVENTION

One of the objects of this invention is to provide an artificial fish bait which provides simulated appearance and action to that of a live bait in order to effectively lure or attract fish. Another object of the invention is to provide an artificial fish bait or lure so designed as to give to substantially imitate the swimming movement of a snake or eel.

Another object of the invention is to provide an artificial fish bait or lure simulating a snake or eel and be provided with a snap on or off colored tab providing further attractant to fish.

More particularly, the invention is directed to an artificial bait or lure composed of a flexible material of rubber or soft plastic material such as polyvinyl chloride that will provide the resiliency to the touch as perhaps, a respective live creature which it simulates. In particular, an eel or snake having a unitary head, body and tail. The body and the tail are so formulated and molded such that, in a static position, it would be retained in a normally S-shaped curve that extends above the head but yet, is capable of undulating with a natural action when drawn through the water.

In one embodiment, the tail includes a replaceable colored tab in order to allow the fisherman to change the color dependent upon the fishing conditions and fishing depth desired.

BRIEF DESCRIPTION OF THE DRAWINGS

FIG. 1 is a perspective view of one form of lure in accordance with this invention.

FIG. 2 is a perspective view of another form of artificial lure according to this invention.

FIG. 3 is a sectional view taken along the line 3—3 of FIG. 2.

DETAILED DESCRIPTION OF THE PREFERRED EMBODIMENT

Figure 4:
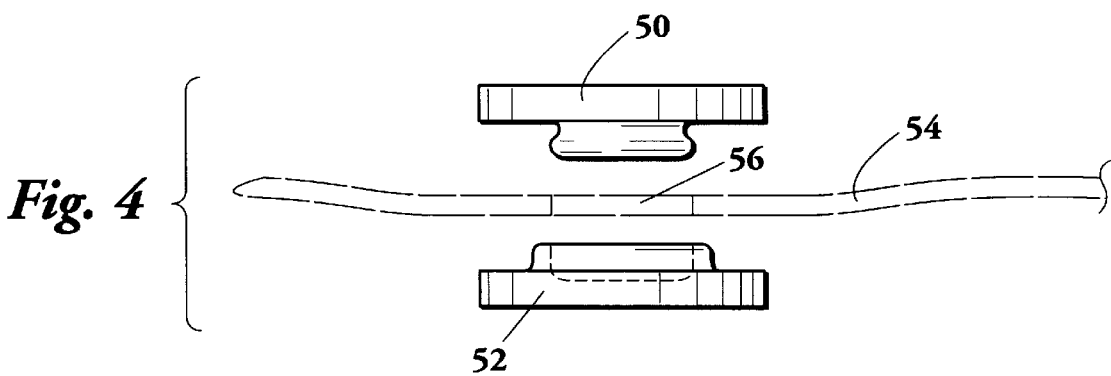
FIGS. 4 and 5 depict a snap-on form of color tab attached to the tail of the lure.

Referring now to FIG. 1, the artificial lure of this invention is preferably comprised of a soft plastic material having resiliency to the touch and feel to the live creature which it simulates and is generally indicated by the numeral 10. The lure comprises a unitary head 12 which in this embodiment is to emulate a snake or eel, a body portion 14 and a tail 16. Typically, the lure would be molded and would include other aspects emulating the live creature by having a formulated spine 18 and ribs 20. A colored tab 30, described hereafter in greater particularity, is removably attached to the tail.

Referring now to FIGS. 2 and 3, another form of lure is depicted having a head 40, a body portion 42 which is smaller and a tail 44. The body portion in this embodiment may be of circular or rounded portion that is smaller in width and/or diameter than the head or tail. The colored tab 30 is also removably attachable to the tail portion as shown. The lure includes a spine 46 connected to outward rib portions 48.

Figure 5:
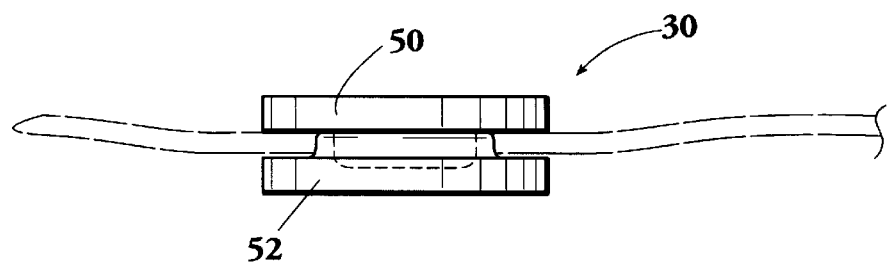

FIGS. 4 and 5 depict one form of colored tab 30 which includes an upper member 50 and a lower member 52 which are attached to the tail 54 of the lure through an opening 56 provided therethrough. FIG. 5 depicts the colored tab in the assembled condition.

Figure 6:
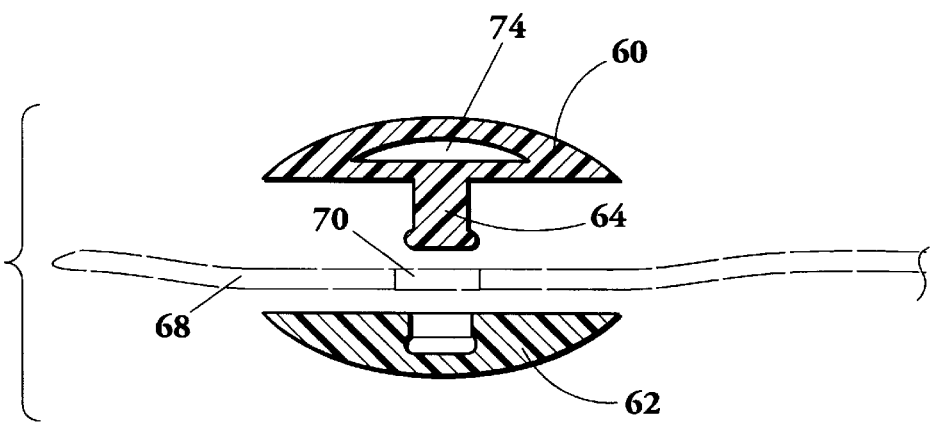
FIGS. 6 and 7 depict an even further form of colored tab that can be used in conjunction with the lure of this invention.
Figure 7:
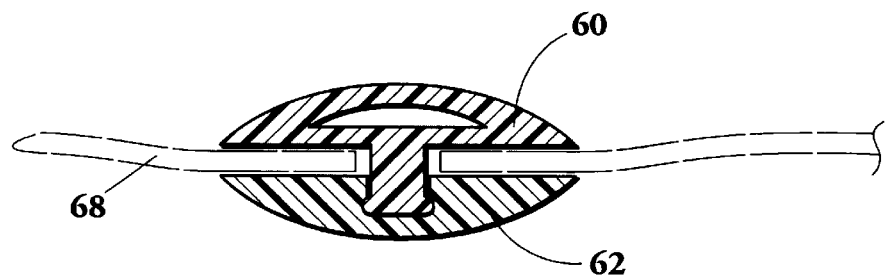

FIGS. 6 and 7 depict another form of colored tab having a streamline form of upper tab 60 and lower tab 62 and respective male and female connecting means 64 and 66 which become assembled to the tail 68 of the artificial lure through an opening 70.

An additional embodiment is to include a sealed chamber 74 within the tab to assist and provide buoyancy to the tail of the lure. Different tabs with different sizes of chambers will provide some adaptability to the fisherman to adjust the motion of the tail of the lure.

Figure 8:
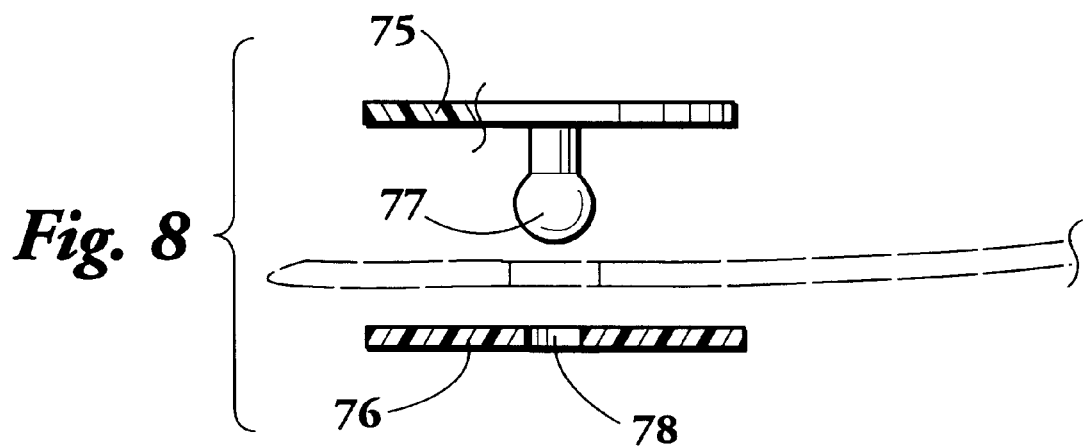
FIGS. 8 and 9 depict another form of colored tab that can be used with the lure of this invention.
Figure 9:
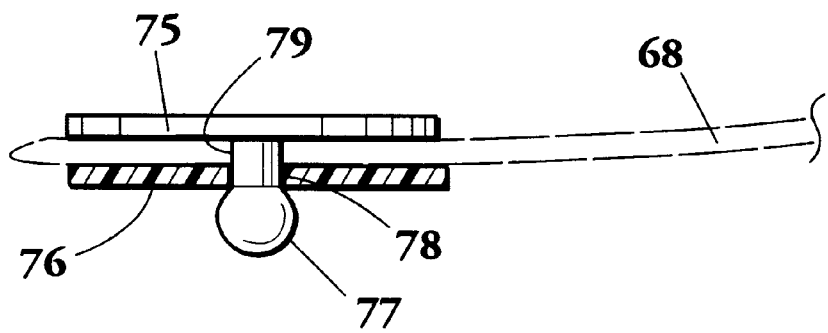

FIGS. 8 and 9 depict another form of colored tab comprised of an upper tab 75 and lower tab 76 having respective male and female connecting means 77 and 78 which are snap assembled to the tail 68 of the artificial lure through an opening 79.

The tab of this invention is to provide a chromatic attractant to the fish. Colors throughout the spectrum, or reflective, or shiny surfaces are inclusive, but not limiting to, the invention.

Figure 10:
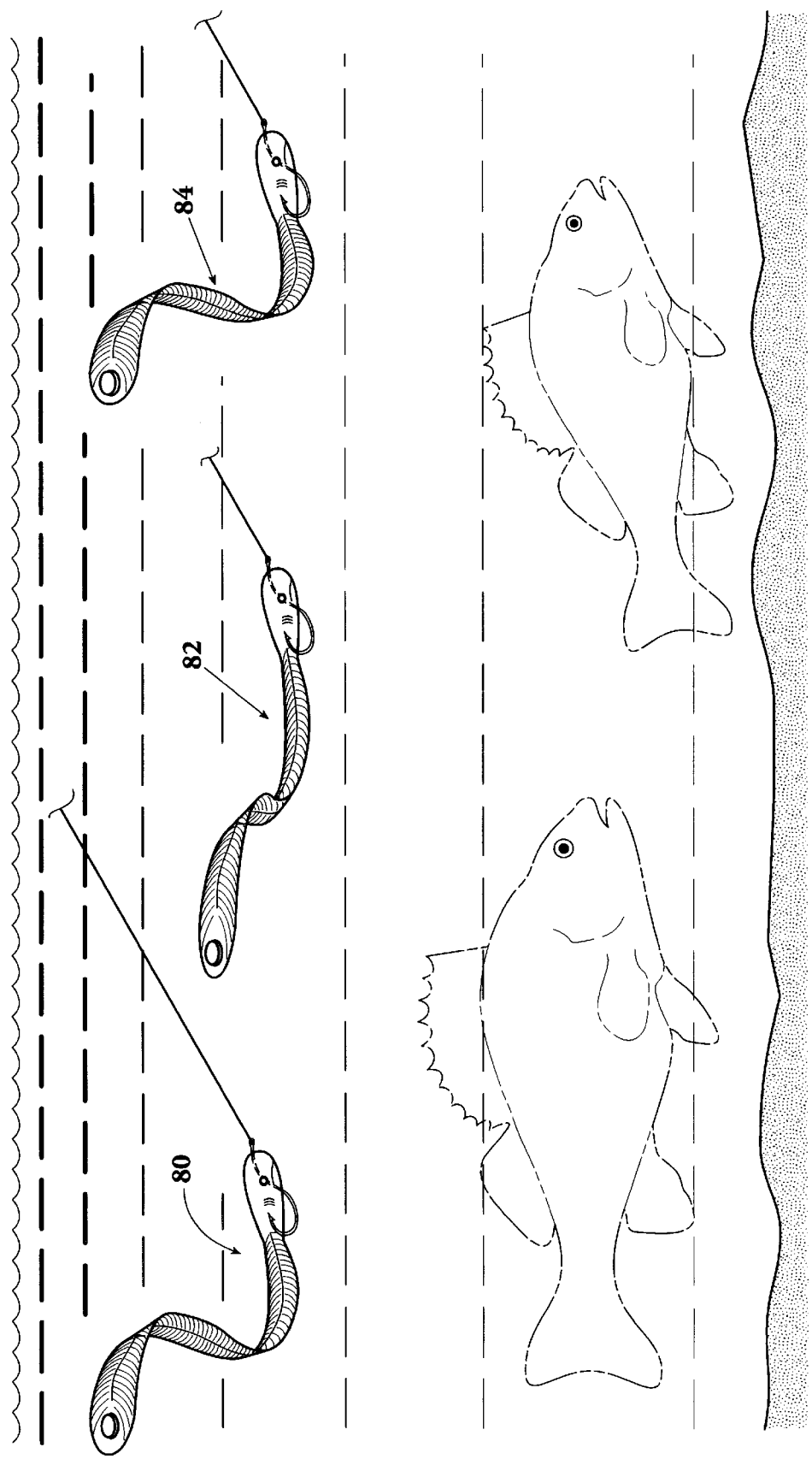
FIG. 10 is a depiction of the movement of the lure of this invention as it is retrieved by the fisherman through the water.

FIG. 10 is a depiction of the motion of the artificial lure of this invention after it has been cast as generally indicated by the numeral 80 wherein the body and the tail of the lure will assume an S-shape which is maintained normally above the head of the lure. As the lure is retrieved, it will undulate in the water to a position substantially and generally designated as 82 and returning to the original S-shape as generally designated at 84 during the retrieve process by the fisherman.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. An artificial fish bait comprising:

an elongated flexible material having a unitary head, body and tail, said tail having a generally thin cross-section, said body and said tail being formed in a generally vertically inclined S-shaped configuration immediately behind and higher than said head and capable of substantially undulating when pulled through water, said tail includes an opening and a replaceable colored tab, said tab comprises upper and lower interlocking members.

2. The fish bait of claim 1 wherein said head simulates a snake or eel.

3. The fish bait of claim 1 wherein said tail includes preformed ribs and spine.

4. The fish bait of claim 1 wherein said body is of smaller width than said head or tail.

5. The fish bait of claim 4 wherein said body is oval or rounded.

6. The fish bait of claim 1 wherein said tab includes buoyancy control means.

7. The fish bait of claim 6 wherein said control means comprises sealed chambers.

8. The fish bait of claim 1 wherein said tab is a chromatic attractant.

* * * * *